(12) United States Patent
Brandt-Slowik et al.

(10) Patent No.: US 11,712,868 B2
(45) Date of Patent: Aug. 1, 2023

(54) VEHICLE GLASS WITH INCREASED RESILIENCE TO ENVIRONMENTAL INFLUENCES

(71) Applicant: SCHOTT AG, Mainz (DE)

(72) Inventors: Juliane Brandt-Slowik, Jena (DE); Thilo Zachau, Neuengönna (DE); Hubert Wieseke, Schkölen (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 17/411,364

(22) Filed: Aug. 25, 2021

(65) Prior Publication Data

US 2022/0063231 A1  Mar. 3, 2022

(30) Foreign Application Priority Data

Aug. 25, 2020 (DE) .................... 10 2020 122 233.5
Aug. 25, 2020 (DE) .................... 20 2020 104 913.5

(51) Int. Cl.
*B32B 3/02* (2006.01)
*B32B 17/10* (2006.01)
(Continued)

(52) U.S. Cl.
CPC .......... *B32B 3/02* (2013.01); *B32B 17/10036* (2013.01); *B32B 17/10091* (2013.01); *B32B 17/10119* (2013.01); *B32B 17/10137* (2013.01); *B32B 17/10357* (2013.01); *B60J 1/02* (2013.01); *C03C 3/089* (2013.01); *C03C 3/091* (2013.01); *C03C 4/18* (2013.01); *B32B 2250/03* (2013.01);
(Continued)

(58) Field of Classification Search
CPC ... B32B 3/02; B32B 17/10; B60J 1/02; C03C 4/18; C03C 3/089; C03C 3/091
USPC ........................................................ 428/174
See application file for complete search history.

(56) References Cited

U.S. PATENT DOCUMENTS 3,708,386 A * 1/1973 Alexander ........ B32B 17/10761
428/215
5,069,734 A * 12/1991 Kavanagh ............... B29C 51/36
156/99
(Continued)

FOREIGN PATENT DOCUMENTS

DE     1126754     3/1962
DE     2224917     12/1972
(Continued)

OTHER PUBLICATIONS

Bruns, "Influence of $Al_2O_3$ Addition on Structure and Mechanical Properties of Borosilicate Glasses", Frontiers in Materials, Jul. 28, 2020, 14 pages.
(Continued)

*Primary Examiner* — Tahseen Khan
(74) *Attorney, Agent, or Firm* — Ruggiero McAllister & McMahon LLC

(57) ABSTRACT

A vehicle glass sheet is provided that includes a borosilicate glass with a thickness between 1.1 mm and 5.4 mm and a two-dimensional area for a sensor assigned to this two-dimensional area. The two-dimensional area has an inclination ($\alpha$) with respect to an upward direction (S) perpendicular to a main direction of movement (V) of the vehicle that is in a range between 35° and 65°.

23 Claims, 7 Drawing Sheets

(51) Int. Cl.
*B60J 1/02* (2006.01)
*C03C 4/18* (2006.01)
*C03C 3/089* (2006.01)
*C03C 3/091* (2006.01)

(52) U.S. Cl.
CPC ....... *B32B 2250/40* (2013.01); *B32B 2315/08* (2013.01); *B32B 2605/006* (2013.01); *B32B 2605/08* (2013.01); *C03C 2204/00* (2013.01)

(56) References Cited

U.S. PATENT DOCUMENTS

| | | | | |
|---|---|---|---|---|
| 5,529,654 | A * | 6/1996 | Kavanagh | ......... B32B 17/10889 156/99 |
| 6,236,391 | B1 | 5/2001 | Kent | |
| 2014/0322472 | A1 | 10/2014 | McCormick | |
| 2016/0263969 | A1 | 9/2016 | Lestringant | |
| 2017/0327402 | A1 * | 11/2017 | Fujii | .................... C03B 23/035 |
| 2018/0154615 | A1 | 6/2018 | Dohn | |
| 2018/0155236 | A1 * | 6/2018 | DeLamielleure | ........................... B32B 17/10036 |
| 2018/0297331 | A1 * | 10/2018 | Gahagan | .................. B60J 1/001 |
| 2019/0308394 | A1 * | 10/2019 | Alkemper | ................. B32B 3/30 |
| 2020/0114735 | A1 * | 4/2020 | Tao | ................... B32B 17/10339 |
| 2020/0354253 | A1 * | 11/2020 | Seuthe | .................... C03C 3/091 |
| 2021/0001696 | A1 * | 1/2021 | Arndt | .................. B32B 17/1066 |

FOREIGN PATENT DOCUMENTS

| | | | |
|---|---|---|---|
| DE | 202009018502 | 12/2011 | |
| EP | 3489053 | 5/2019 | |
| WO | 2020025360 | 2/2020 | |
| WO | WO-2020025360 A1 * | 2/2020 | ....... B32B 17/10036 |

OTHER PUBLICATIONS

Hermansen, "Densification and plastic deformation under microindentation in silicate glasses and the relation to hardness and crack resistance", Elsevier, Journal of Non-Crystalline Solids, vol. 364, 2013, pp. 40-43.

ASTM D 1003-00, "Standard Test Method for Haze and Luminous Transmittance of Transparent Plastics", 2000, 6 pages.

Hermansen, "Quantitative Evaluation of Densification and Crack Resistance in Silicate Glasses", Master Thesis, Aalborg University, Denmark, Jul. 5, 2011.

* cited by examiner

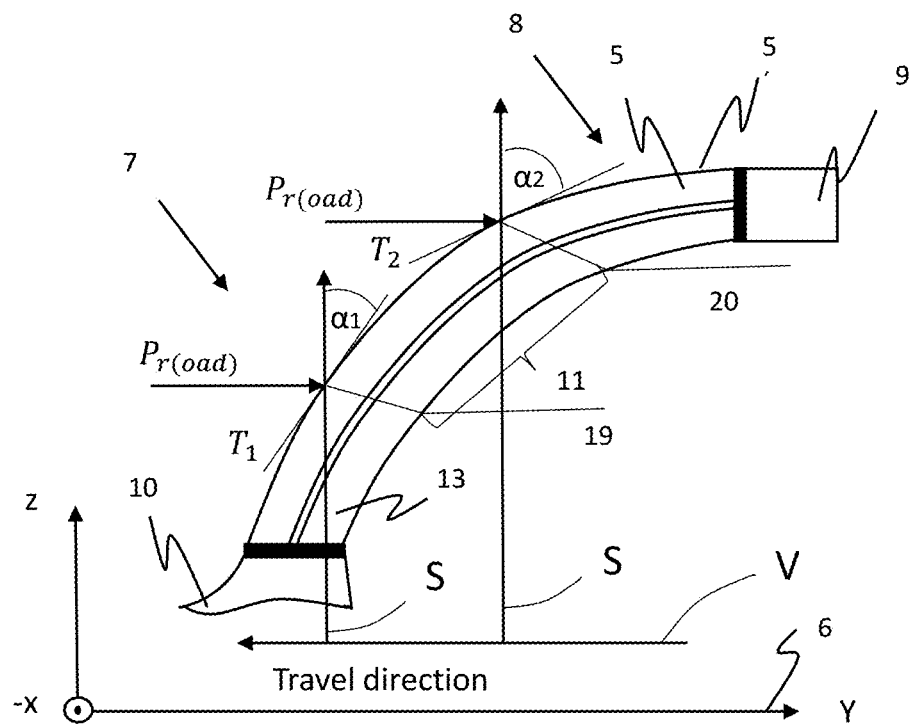
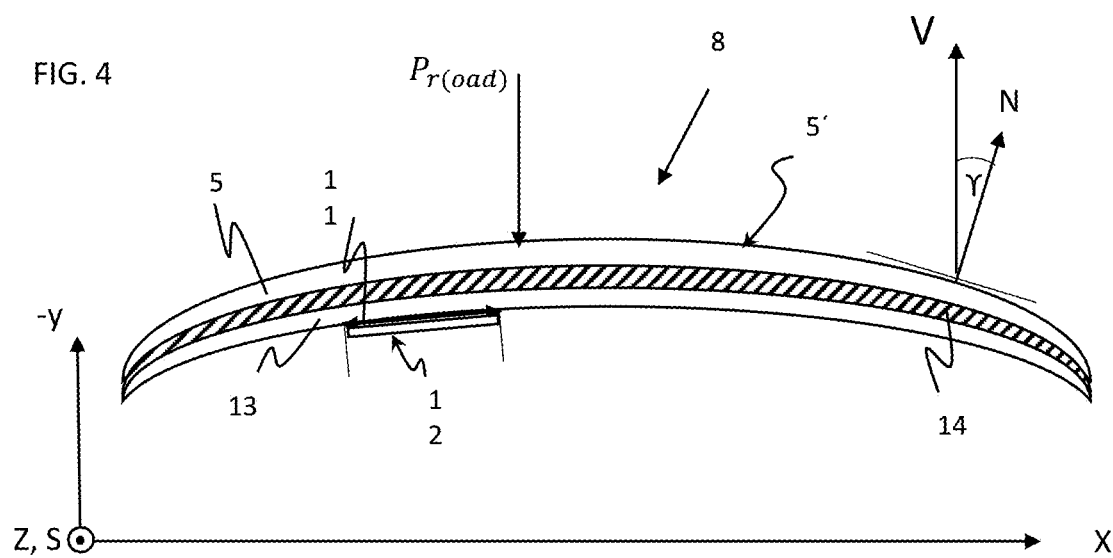

Scale applying to all panels — 1 mm

Scale applying to all panels — 1 mm

VEHICLE GLASS WITH INCREASED RESILIENCE TO ENVIRONMENTAL INFLUENCES

CROSS REFERENCE TO RELATED APPLICATIONS

This application claims benefit under 35 USC § 119(a) of German Application 10 2020 122 233.5 filed Aug. 25, 2020 and 20 2020 104 913.5, the entire contents of both of which are incorporated herein by reference.

BACKGROUND

1. Field of the Invention

The invention relates to a vehicle glass sheet comprising a borosilicate glass, and to an assembly as well as to a laminate comprising such a vehicle glass sheet.

2. Description of Related Art

During normal operation of a motor vehicle, vehicle glass is subject to many different types of environmental influences, including mechanical loads, for example caused by particles impinging thereon.

Although such particles will usually be of various shapes, sizes and hardnesses, there are typical stress situations which exhibit and permanently leave typical damage features on the surface of the vehicle glass.

For example, during inner-community or inner-city road construction work, grit is often applied over freshly paved new road sections and may be thrown up by traffic ahead and thrown against vehicles behind, for example.

In this case, glazings, in particular glazings comprising mineral glasses, might react particularly sensitively, since such grit particles usually have a higher hardness than conventional motor vehicle glass.

Moreover, increasingly complex sensor systems that in particular include optical sensor devices are more and more finding their way into today's motor vehicles, often together with driver assistance systems, in particular in order to be able to move the vehicles more safely and without avoidable impairments in road traffic.

However, it is precisely such sensory devices and also driver assistance systems that rely on reliable data acquisition which in many cases is achieved in the vehicle itself, often even directly behind the windshield thereof.

Hence, the quality of the windshield as a sensory interface between the interior and the exterior of the vehicle is becoming increasingly important.

If such optical sensory devices comprise or at least form part of image-capturing systems, the necessary image quality is of essential importance for correct sensory recognition by subsequent systems, and usually it is necessary to be able to permanently provide in particular sufficient optical resolution in combination with appropriate contrast.

However, if scattered light is generated within this optical interface between the exterior and the interior of a vehicle and is superimposed on the imaging components of the light detected by the sensors, this can considerably reduce the contrast of the image provided by the imaging device.

This may become particularly precarious in situations in which very bright, in particular punctiform light sources are to be recorded together with significantly less bright image areas. This situation usually occurs when it is dark and in the case of oncoming vehicles or when the sun is low, and if the optical interface is of poor quality, this can even lead to a complete failure of the optical sensors, especially if the contrast is reduced by high levels of stray light so that appropriately reliable imaging or image processing is no longer possible.

In summary it can be stated that sensors which are supposed to function reliably require good visibility, especially in the context of autonomous driving.

SUMMARY

The invention is intended to ensure that such interfering or extraneous light components are kept as low as possible even after mechanical stress and in particular after damage to the surface.

This is achieved with a vehicle glass sheet, in particular a motor vehicle glass sheet, which comprises a borosilicate glass, in particular a borosilicate glass sheet produced by a float process, which has a thickness between 1.1 mm and 5.4 mm, a two-dimensional area for a sensor that is assigned to this two-dimensional area, in particular an optical sensor, preferably an imaging optical sensor, wherein an inclination $\alpha$ of at least this two-dimensional area with respect to an upward direction S perpendicular to a main direction of movement V of the vehicle, in particular a direction vertically upward relative to a main direction of movement (V) of the vehicle, is in a range between 35° and 65°, preferably between 40° and 60°.

In the context of the present disclosure, the inclination $\alpha$ is measured with respect to an upward direction perpendicular to the travel direction of the vehicle and is counted positive in the clockwise direction when the vehicle is moving to the left, as shown in FIGS. 3 and 12. In conjunction with the Cartesian coordinate system shown in the figures and including the respective orthogonal spatial directions X, Y, and Z, it is assumed, without loss of generality and merely by way of example, that the upward direction S extends in the Z direction, i.e. in the vertically upward direction, and that the travel direction of the vehicle is in the negative Y direction. It would generally be advantageous if the absolute value of the generated scattered light were not only low, but also as little as possible dependent on the direction of the damage.

Then, often even in the case of curved vehicle glass, an operation position for a sensor area can be found which together with the advantages mentioned above still exhibits the highest possible long-term operational stability, despite damage.

For the purposes of the present disclosure, it is furthermore assumed that the main direction of movement of the vehicle is defined by its movement parallel to a plane located below the vehicle, preferably a horizontal plane, and for determining the main direction of movement, the speed of the vehicle is not subject to any acceleration such as an increase or decrease in speed nor to any directional change in the vehicle's travel direction, and that the plane relative to which the vehicle moves parallel does not include any change in level, since it extends horizontally, and thus does not lead to an ascent or a descent of the vehicle during its movement. This allows to very precisely indicate the inclination angle $\alpha$ in particular for the arrangement of the borosilicate glass sheet on or in the vehicle, which based on the installation position of the vehicle glass allows for a defined alignment thereof relative to the nominal travel direction of the vehicle, and in particular permits test results, for example from a grit trickle test, to be transferred to real driving situations. Moreover, this main direction of movement covers the majority of real driving situations in which the travel direction of the vehicle carrying the borosilicate glass sheet according to the invention will only deviate by small angles from the main direction of movement as defined above.

In vehicles, in particular in vehicles that are exposed to an increased particle load, in particular in vehicles for use in a harsh operational environment in which more than 50% of the particles come from an area at a higher level than the borosilicate glass sheet and impinge at an average angle of β1 with respect to the main direction of movement of the vehicle, the inclination α of at least the two-dimensional area assigned to the sensor may range between 35°+β1 and 65° with respect to an upward direction S perpendicular to a main direction of movement V of the vehicle. Such particle loads can occur in quarries, during gravel mining, or in agriculture, for example.

In the present context, particles are considered to be solid particles such as commonly occurring in everyday driving situations of a motor vehicle. The particles as mentioned herein for the specification of the angle in the preceding and subsequent paragraphs correspond to integral particles with a weight of about 0.1 g, i.e. 0.0001 kg, for which respective measurements such as in a grit trickle test will be explained in more detail below. However, if more than 50% of the particles come from an area at a deeper level than the borosilicate glass sheet and impinge at an average angle of β2 with respect to the main direction of movement of the vehicle, the inclination α of at least the two-dimensional area assigned to the sensor may range between 35° and 60°−β2 with respect to an upward direction perpendicular to a main direction of movement of the vehicle. Such particle loads may occur in road and bridge construction work, for example.

In certain embodiments, the borosilicate glass sheet may have a curvature, at least in some areas thereof. In these cases, tangents $T_1$, $T_2$ to the surface of the borosilicate glass sheet lying within the two-dimensional area assigned to a sensor shall have an inclination α in a range between 35° and 60° with respect to an upward direction S perpendicular to a main direction of movement of the vehicle.

The two-dimensional area assigned to the sensor can be located within the upper third, preferably the upper fifth, of the borosilicate glass sheet as defined in the installation position thereof, for example.

In preferred embodiments, the borosilicate glass sheet may be thermally toughened. In embodiments with a thermally toughened borosilicate glass sheet, a near-surface compressive stress may amount to values between 100 MPa and 300 MPa.

In further preferred embodiments, the borosilicate glass sheet may be chemically toughened. In embodiments with a chemically toughened borosilicate glass sheet, a near-surface compressive stress, CS, may have values from 100 MPa to 300 MPa. In embodiments with a chemically toughened borosilicate glass sheet, a depth of the compressive stress zone, also known as Depth of Layer (DoL), may range from 25 μm to 50 μm.

Advantageously, the borosilicate glass sheet comprises a borosilicate glass or consists of a borosilicate glass comprising a composition with the following constituents (in wt %):
  $SiO_2$ 70-87
  $B_2O_3$ 7-25
  $Na_2O+K_2O$ 0.5-9
  $Al_2O_3$ 0-7
  $CaO$ 0-3

The positive properties of borosilicate glass as will be described in more detail below, in particular with reference to the grit trickle test, can be achieved in particular with the composition described above.

Further embodiments of the borosilicate glass sheet may also comprise or consist of a borosilicate glass comprising a composition with the following constituents (in wt %):
  $SiO_2$ 70-86
  $Al_2O_3$ 0-5
  $B_2O_3$ 9.0-25
  $Na_2O$ 0.5-5.0
  $K_2O$ 0-1.0
  $Li_2O$ 0-1.0.

In the presently disclosed embodiments, the above composition is preferably used in combination with an additional condition. Since this additional condition is more advantageously formulated in mole percent, mol % for short, the composition of the borosilicate glass disclosed above will first be given converted into mol %.

For each oxide, the clearly defined lower and upper limits of the composition range are given in mole percent, which also correspond to the concentration range of this oxide in mole percent in each case, for which a mole percent composition corresponding to all the composition ranges in percent by weight as specified above can be described as follows:
  $SiO_2$ 71.8-88.7
  $B_2O_3$ 7.8-22.7
  $Al_2O_3$ 0-3.1
  $Na_2O$ 0.5-5.1
  $K_2O$ 0-0.6
  $Li_2O$ 0.0-2.1.

The additional condition results from the context as explained in more detail below.

If alkali and alkaline earth oxides are present, both boron and aluminum ions tend to attract the oxygen therefrom, that is the oxygen initially bound to the alkali and alkaline earth oxides, and to transition into a tetrahedral coordination. Thus, the so formed tetrahedra fit better into the network which essentially consists of silicon oxide tetrahedra.

In this case, the aluminum ions have priority, see Sebastian Bruns, Tobias Uesbeck, Dominik Weil, Doris Möncke, Leo van Wüllen, Karsten Durst, and Dominique de Ligny, Influence of $Al_2O_3$ Addition on Structure and Mechanical Properties of Borosilicate Glasses, Front. Mater., Jul. 28, 2020, so that boron ions are left over if not enough oxygen ions are provided by the alkali and alkaline earth oxides. These boron atoms will then be coordinated trigonally.

The proportion of this trigonal boron is calculated as follows, in mol %:

$$c_{B2O3,trigonal} = c_{B2O3} + c_{Al2O3} - c_{Na2O} - c_{K2O} - c_{Li2O}$$

Here, "c" stands for the respective concentration in mol %. $c_{B2O3}$ stands for the total concentration of $B_2O_3$, $c_{B2O3,trigonal}$ is the proportion trigonally coordinated according to this calculation. Thus:

$c_{B2O3,trigonal}$ is the concentration of the trigonally bound boron, in mol %

$c_{B2O3}$ is the concentration of boron oxide $B_2O_3$, in mol %

$c_{Al2O3}$ is the concentration of aluminum oxide $Al_2O_3$, in mol %

$c_{Na2O}$ is the concentration of sodium oxide $Na_2O$, in mol %

$c_{K2O}$ is the concentration of potassium oxide $K_2O$, in mol %

$c_{Li2O}$ is the concentration of lithium oxide $Li_2O$, in mol %

Thus, in all the composition specifications of the presently disclosed borosilicate glass, the above concentrations $c_{B2O3}$, $c_{Al2O3}$, $c_{Na2O}$, $c_{K2O}$, $c_{Li2O}$ correspond to the respective proportions in the composition, given in mol %, of the oxide that is given in the subscript.

It is advantageous if $c_{B2O3,trigonal}$ is greater than zero, since three trigonally coordinated boron atoms come together to form a planar structure, i.e. a boroxole ring, see Christian Hermansen, Quantitative Evaluation of Densification and Crack Resistance in Silicate Glasses, Master Thesis, Aalborg University, Denmark, Jul. 5, 2011. These boroxole rings tend to aggregate, and adjacent boroxole rings are able to slide on one another.

These boroxole rings aggregated in the borosilicate glass network thus form domains with a layered structure. Parallel to these layers, the glass network is able to absorb forces without suffering from breaking bonds. This improves the brittle fracture behavior of the glass, and the presently disclosed resistance is achieved, in particular improved stone impact resistance. Evidence of the proportion of the boroxole structure can be provided by an 11B-MAS-NMR analysis technique, for example.

With the condition specified below, the boroxole rings aggregated in the borosilicate glass network thus provide a kind of internal "lubricant". This counteracts the brittleness and thus also surface damage.

On the other hand, an excessive proportion of trigonal boron would be unfavorable with regard to chemical resistance, in particular alkali resistance, since hydroxyl ions ingressing by diffusion would then be able to move very quickly along the "slide planes" mentioned above.

However, adequate alkali resistance is important especially for the long-term durability of motor vehicle glass, since the latter is often exposed to alkali during operation, which may be caused by environmental influences, for example, or during cleaning, such as in car washes, or by additives in windshield cleaning fluids.

Therefore, for a first group of borosilicate glasses, it is preferred for the composition as given above in mol % that $c_{B2O3,trigonal}$ is at least 3 mol %, preferably at least 5 mol %, more preferably at least 7 mol %, most preferably at least 9 mol %, but not more than 11 mol %, preferably not more than 10 mol %.

Hence, the following is generally true for the composition of the borosilicate glasses of the first group, in mol %:

$B_2O_3+Al_2O_3-Na_2O-K_2O-Li_2O \geq 3$ mol % and $B_2O_3+Al_2O_3-Na_2O-K_2O-Li_2O \leq 11$ mol %.

Moreover, the following is true for preferred embodiments:

$B_2O_3+Al_2O_3-Na_2O-K_2O-Li_2O \geq 5$ mol % and $B_2O_3+Al_2O_3-Na_2O-K_2O-Li_2O \leq 10$ mol %.

Moreover, the following is true for particularly preferred embodiments of the first group of borosilicate glasses:

$B_2O_3+Al_2O_3-Na_2O-K_2O-Li_2O \geq 7$ mol % and $B_2O_3+Al_2O_3-Na_2O-K_2O-Li_2O \leq 9$ mol %.

Moreover, the following is true for most preferred embodiments of the first group of borosilicate glasses:

$B_2O_3+Al_2O_3-Na_2O-K_2O-Li_2O \geq 9$ mol % and $B_2O_3+Al_2O_3-Na_2O-K_2O-Li_2O \leq 10$ mol %.

For a second group of borosilicate glasses, which in particular exhibits higher alkali resistance, $c_{B2O3,trigonal}$ is at least 2 mol %, preferably at least 4 mol %, and particularly preferably at least 6 mol %, but not more than 10 mol %, preferably not more than 8 mol %.

Hence, the following is generally true for the second group of borosilicate glasses:

$B_2O_3+Al_2O_3-Na_2O-K_2O-Li_2O \geq 2$ mol % and $B_2O_3+Al_2O_3-Na_2O-K_2O-Li_2O \leq 10$ mol %.

Moreover, the following is true for preferred embodiments of the second group of borosilicate glasses:

$B_2O_3+Al_2O_3-Na_2O-K_2O-Li_2O \geq 4$ mol % and $B_2O_3+Al_2O_3-Na_2O-K_2O-Li_2O \leq 8$ mol %.

Moreover, the following is true for particularly preferred embodiments of the second group of borosilicate glasses:

$B_2O_3+Al_2O_3-Na_2O-K_2O-Li_2O \geq 6$ mol % and $B_2O_3+Al_2O_3-Na_2O-K_2O-Li_2O \leq 8$ mol %.

Still further embodiments of the borosilicate glass sheet may comprise or consist of a borosilicate glass comprising a composition with the following constituents (in wt %):

$SiO_2$ 78.3-81.0
$B_2O_3$ 9.0-13.0
$Al_2O_3$ 3.5-5.3
$Na_2O$ 3.5-6.5
$K_2O$ 0.0-2.0, preferably 0.3-2.0
$CaO$ 0.0-2.0.

In the presently disclosed embodiments, the above composition is preferably also used in combination with an additional condition. Since this additional condition is more advantageously formulated in mole percent, the composition of the borosilicate glass disclosed above will first be given converted into mol %.

For each oxide, the clearly defined lower and upper limits of the composition range are given in mole percent, which also correspond to the respective concentration range of this oxide in mol %, for which a mole percent composition corresponding to all of the composition ranges as specified above in percent by weight can be described as follows:

$SiO_2$ 80.7-84.3
$B_2O_3$ 8.0-11.6
$Al_2O_3$ 2.2-3.2
$Na_2O$ 3.5-6.5
$K_2O$ 0.2-1.3
$CaO$ 0.0-2.2.

Here, the additional condition is:

$c_{B2O3,trigonal}=c_{B2O3}+c_{Al2O3}-c_{Na2O}-c_{K2O}-c_{CaO}$

It is therefore preferred for the composition given above in mol % for a first group of borosilicate glasses that $c_{B2O3,trigonal}$ is at least 3 mol %, preferably at least 5 mol %, more preferably at least 7 mol %, most preferably at least 9 mol %, but not more than 11 mol %, preferably not more than 10 mol %.

Hence, the following is generally true for the composition of the borosilicate glasses of the first group, in mol %:

$B_2O_3+Al_2O_3-Na_2O-K_2O-CaO \geq 3$ mol % and $B_2O_3+Al_2O_3-Na_2O-K_2O-CaO \leq 11$ mol %.

Moreover, the following is true for preferred embodiments:

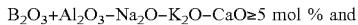
$B_2O_3+Al_2O_3-Na_2O-K_2O-CaO \geq 5$ mol % and

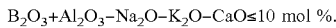
$B_2O_3+Al_2O_3-Na_2O-K_2O-CaO \leq 10$ mol %.

Moreover, the following is true for particularly preferred embodiments of the first group of borosilicate glasses:

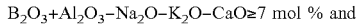
$B_2O_3+Al_2O_3-Na_2O-K_2O-CaO \geq 7$ mol % and

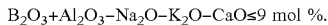
$B_2O_3+Al_2O_3-Na_2O-K_2O-CaO \leq 9$ mol %.

Moreover, the following is true for most preferred embodiments of the first group of borosilicate glasses:

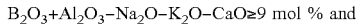
$B_2O_3+Al_2O_3-Na_2O-K_2O-CaO \geq 9$ mol % and

$B_2O_3+Al_2O_3-Na_2O-K_2O-CaO \leq 10$ mol %.

For a second group of borosilicate glasses, which in particular exhibits higher alkali resistance, $c_{B2O3,trigonal}$ is at least 2 mol %, preferably at least 4 mol %, and particularly preferably at least 6 mol %, but not more than 10 mol %, preferably not more than 8 mol %.

Hence, the following is generally true for the second group of borosilicate glasses:

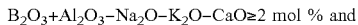
$B_2O_3+Al_2O_3-Na_2O-K_2O-CaO \geq 2$ mol % and

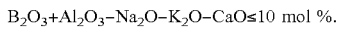
$B_2O_3+Al_2O_3-Na_2O-K_2O-CaO \leq 10$ mol %.

Moreover, the following is true for preferred embodiments of the second group of borosilicate glasses:

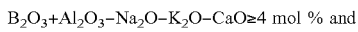
$B_2O_3+Al_2O_3-Na_2O-K_2O-CaO \geq 4$ mol % and

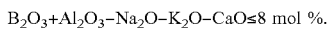
$B_2O_3+Al_2O_3-Na_2O-K_2O-CaO \leq 8$ mol %.

Moreover, the following is true for particularly preferred embodiments of the second group of borosilicate glasses:

$B_2O_3+Al_2O_3-Na_2O-K_2O-CaO \geq 6$ mol % and

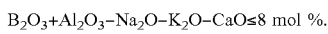
$B_2O_3+Al_2O_3-Na_2O-K_2O-CaO \leq 8$ mol %.

In the context of the present disclosure, a laminate is furthermore specified which comprises at least one floated borosilicate glass sheet as described above, with a thickness between 1.1 mm and 5.4 mm, at least one further glass sheet, and at least one polymer intermediate layer.

The further glass sheet may, for example, comprise or be made of a borosilicate glass as presently disclosed, or else a soda-lime glass.

In this laminate, a sensor, in particular an optical sensor, may be disposed between the borosilicate glass sheet and the further glass sheet, in particular in or close to the polymer intermediate layer between the borosilicate glass sheet and the further glass sheet.

In further embodiments, which may be intended for retrofitting conventional vehicle glass, for example, the borosilicate glass sheet may be arranged at least in front of a two-dimensional area which has a sensor assigned to, in particular an optical sensor, preferably an imaging optical sensor.

Such an assembly is particularly advantageous if the vehicle glass or the first sheet of a laminate does not comprise borosilicate glass, but instead comprises or is made of a soda-lime glass, for example. In this case, the advantages described in conjunction with the present disclosure can also be transferred to conventional vehicle glass.

In many cases it can be sufficient if the borosilicate glass sheet is arranged only in front of the two-dimensional area that has a sensor assigned to, in particular an optical sensor. When this borosilicate glass sheet arranged in front of the respective sensors is replaced, it will thus not be necessary to replace the entire vehicle glass, and considerable cost savings can be achieved. Such cost savings can play an important role in particular in the commercial sector.

In these embodiments, a polymer intermediate layer disposed between the borosilicate glass sheet and the first motor vehicle glass sheet which does not comprise borosilicate glass but in particular a soda-lime glass, may be tinted, for example in order to reduce heat radiation into the interior of the motor vehicle.

Due to its advantages as disclosed above, the motor vehicle glass sheet may in particular be a windshield which is usually exposed to a higher particulate load than, for example, panoramic windows installed in the vehicle roof or than side and rear window glass.

DESCRIPTION OF THE DRAWINGS

The invention will now be described in more detail by way of exemplary embodiments with reference to the accompanying drawings, wherein:

FIG. 3 is a vertical sectional view of a motor vehicle glass comprising a borosilicate glass sheet according to a first embodiment, showing the motor vehicle glass in its nominal installation position in a motor vehicle;

FIG. 4 shows a horizontal sectional view of a motor vehicle glass comprising a borosilicate glass sheet according to a further embodiment;

DETAILED DESCRIPTION

In the following detailed description of preferred embodiments, the same reference symbols denote the same or equivalent components. For the sake of better comprehension and for the sake of clarity, the figures are not drawn to scale.

Figure 1:
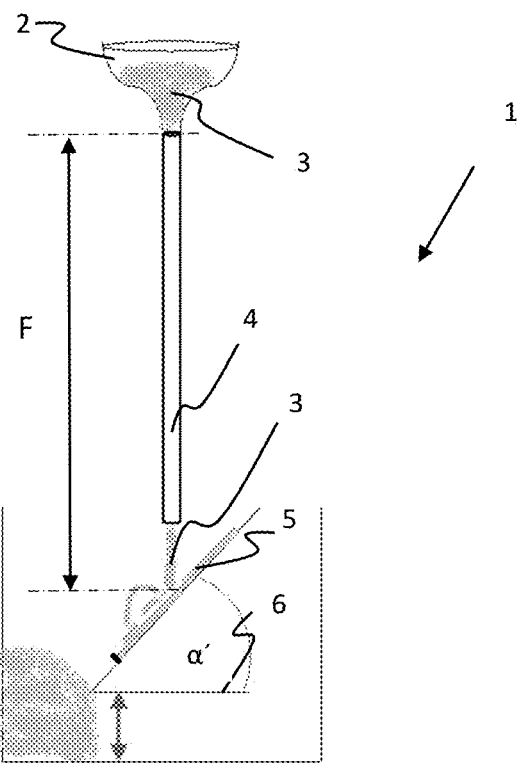
FIG. 1 is a highly schematic front elevational view of a setup for performing a grit trickle test.

Referring now to FIG. 1 which shows a highly schematic front elevational view of a setup 1 for performing a grit trickle test. A container 2 with an opening at the bottom holds grit particles 3 which, from the container 2, can enter a free fall tube 4 and leave the tube after a free fall section F towards a glass sheet 5, where the grit particles 3 impinge with a defined particle momentum $P_{t(trickle)}$ which is defined by the respective mass of the particle and the speed $V_{max}$ obtained along free fall section F.

In order to avoid adhesion, the particles 3 were dried before performing the grit trickle test, so as to ensure that only a single respective particle 3 impinges on the glass sheet 5 independently of other particles, and not coherent particle agglomerates.

Glass sheet 5 was arrangeable at respective different angles of inclination α', this inclination angle α' being the angle to a horizontal plane 6 relative to which the grit particles 3 moved vertically until impinging on the glass sheet 5.

Each respective grit trickle test as described above was performed for a defined angle of inclination α' as indicated in the figures until the indicated total amount of grit particles 3 had impinged on the glass sheet 5.

For each angle of inclination α', a new glass sheet 5 with surfaces free of damage was used for the respective grit trickle test. Once the grit trickle test had been concluded for each of these angles, each glass sheet 5 was examined microscopically and by scattered light measurement.

Figure 2:
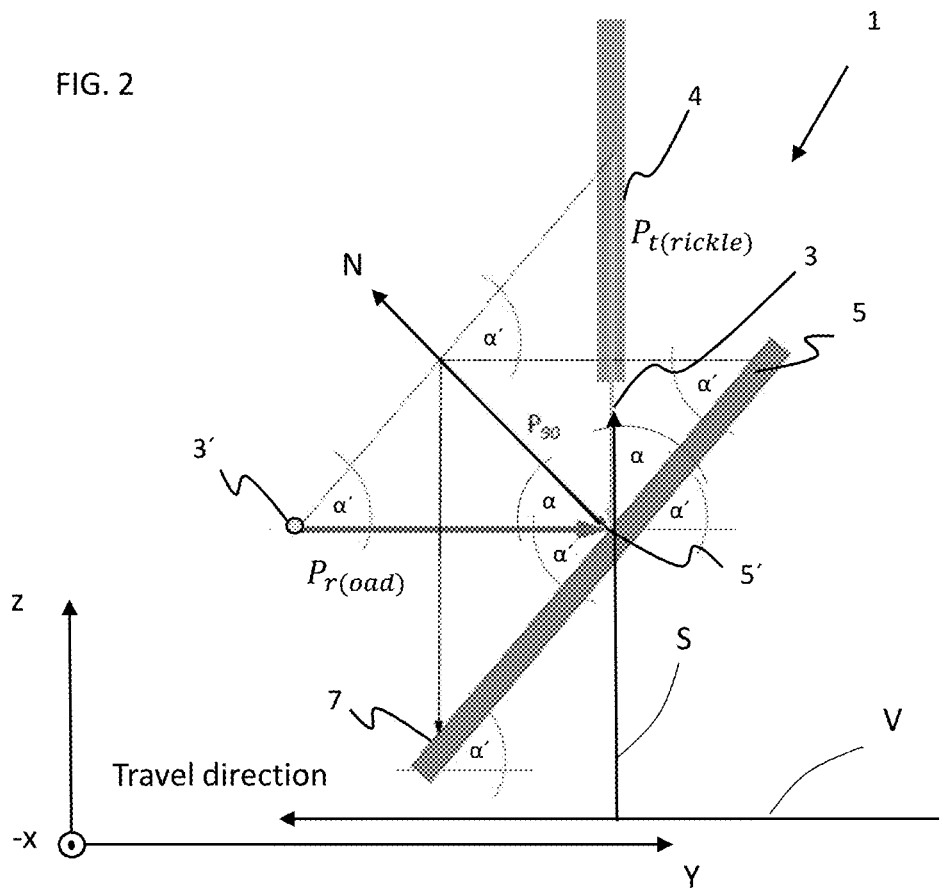
FIG. 2 is an even more schematic front view of a setup for performing a grit trickle test, which additionally illustrates particle momentums as occurring in motor vehicles in typical travel situations.

The free fall height F was 1.65 m, which gives a particle velocity $v_{max}$ upon impingement on the glass sheet 5 of about 5.689 m/s, with $v_{max} = \sqrt{(2gh)}$. The average particle mass of the grit particles was 0.1 g, i.e. 0.0001 kg. The momentum of the particles upon impingement $P_t$ (per particle) was m·v=0.000568973 Ns, this momentum is indicated in FIG. 2 as $P_{t(trickle)}$. For a total mass of the particles of 0.25 kg, a total momentum of all particles was about 1.422431896 Ns. For a total mass of the particles of 0.5 kg, the resulting total momentum of all particles was about 2.844863793 Ns. The particles consisted of particulate basalt grit.

This measurement of haze was performed in compliance with ASTM D1003 (CIE C) using an appropriately calibrated haze measuring device, in the present case the Haze-Gard plus AT-4725 device from BYK-Gardner.

Table 1 below shows the values for the measured scattered light, i.e. haze, as obtained in a grit trickle test with the parameters given above. The values labeled Haze SL are the haze values measured for soda-lime glass, and those labeled Haze BS are the values measured for borosilicate glass.

Neither the glass sheet 5 made of soda-lime glass nor the glass sheet 5 made of borosilicate glass was toughened, and for each angle of inclination α' given below, an amount of 0.25 kg of basalt grit was used.

TABLE 1

| Haze values for soda-lime glass (SL) and borosilicate glass (BS) | | |
|---|---|---|
| α' (°) | Haze SL (%) | Haze BS (%) |
| 15 | 8.9 | 5.3 |
| 20 | 9.6 | 5.7 |
| 25 | 9.2 | 5.5 |
| 30 | 10.8 | 5.5 |
| 35 | 11.1 | 5.1 |
| 40 | 11.5 | 4.9 |
| 45 | 9.6 | 5.0 |
| 50 | 8.6 | 4.0 |
| 55 | 6.3 | 4.8 |
| 60 | 5.5 | 3.7 |

The probability of double/multiple impacts is the same for these types of glass, since the same amount of grit was used under the same conditions when performing the grit trickle test.

In the case of borosilicate glass which is less brittle than soda-lime glass, a single impact tends to create individual small depressions (dots) in the glass surface, but usually no chipping. In the case of another impact at this same point, this crater usually only deepens. In contrast to soda-lime glass, borosilicate glass exhibits stronger plastic deformation, which is assigned to less haze-implying breakage.

Soda-lime glass is more brittle than borosilicate glass, so that multiple impacts cause chipping. This chipping or chips on the surface lead to an increased haze value, due to the resulting chipped-off surface texture (fracture pattern) and the at least partially occurring multiple optical (air-glass) transitions. This results in an amplification of scattered light as caused by respective fracture patterns.

Furthermore, soda-lime glass has a greater refractive index than the borosilicate glass employed here, so that a defect of the same size leads to a stronger scattering effect in soda-lime glass, and thus to higher haze values. The refractive index of soda-lime glass is greater than 1.5, whereas the refractive index of the borosilicate glass as used here was about 1.47.

Figure 5:
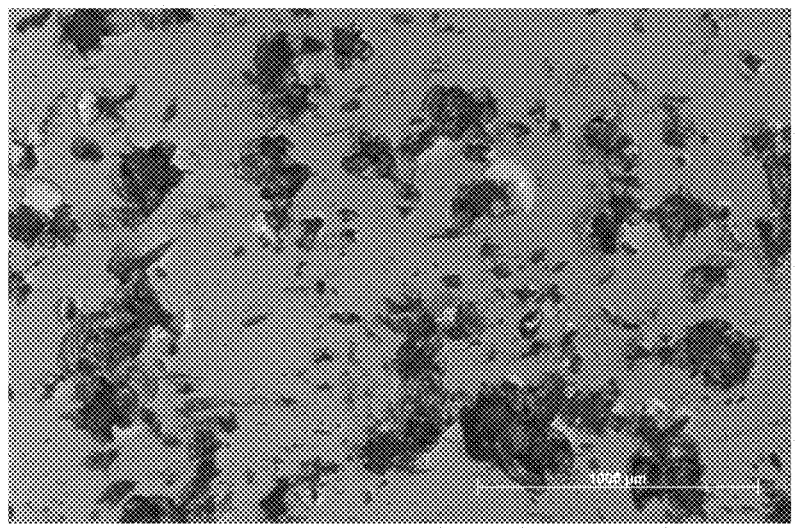
FIG. 5 shows a micrograph of the surface of a soda-lime glass sheet that was subjected to a grit trickle test in which this surface was exposed to the action of the grit particles.
Figure 6:
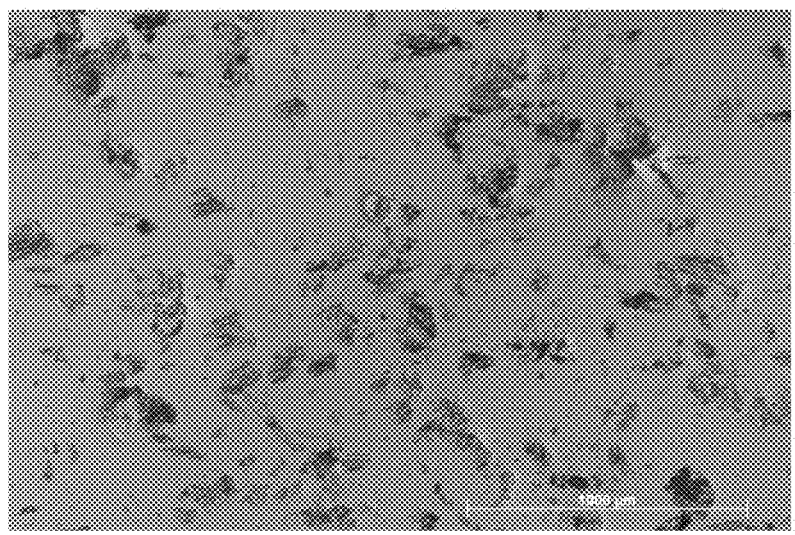
FIG. 6 shows a micrograph of the surface of a borosilicate glass sheet which was subjected to a grit trickle test in which this surface was exposed to the action of the grit particles.

FIG. 5 shows a light microscopic image of the surface of a soda-lime glass sheet, and FIG. 6 shows that of a borosilicate glass sheet. It can be clearly seen that under the same test conditions the damaged areas in the case of soda-lime glass were much larger than in the case of borosilicate glass, which is in good agreement with the results from the scattered light measurement, i.e. with haze.

Figure 7:
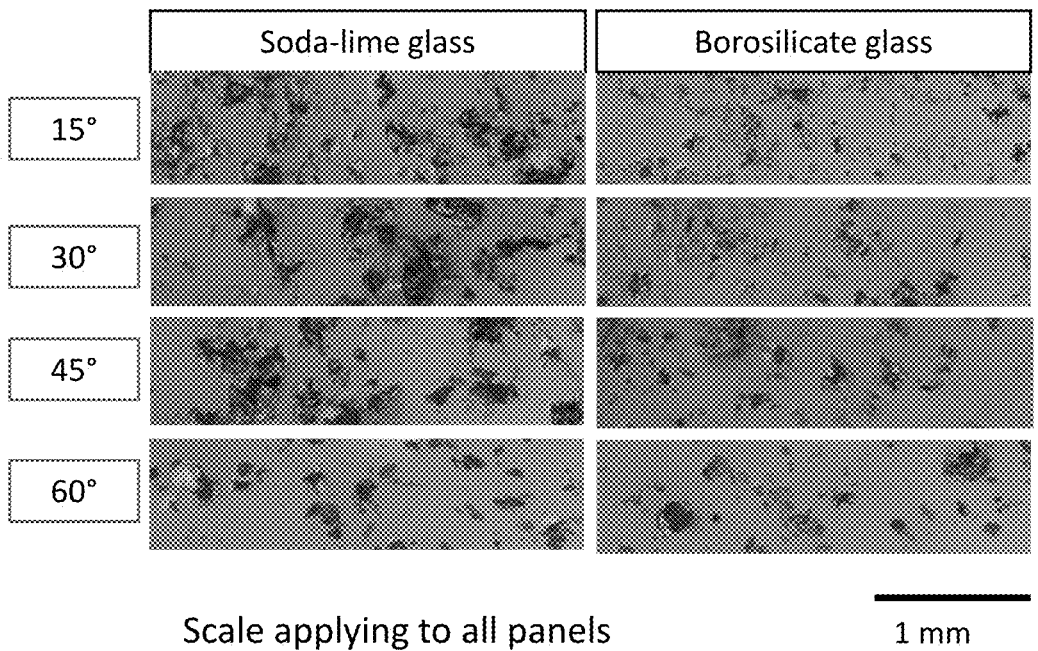
FIG. 7 shows micrographs of surfaces of a soda-lime glass sheet and of a borosilicate glass sheet, which were subjected to a grit trickle test in which these surfaces were exposed to the action of the grit particles, for different angles α' at which the grit particles impinge on the respective glass sheet, and wherein neither the soda-lime glass sheet nor the borosilicate glass sheet was toughened.
Figure 8:
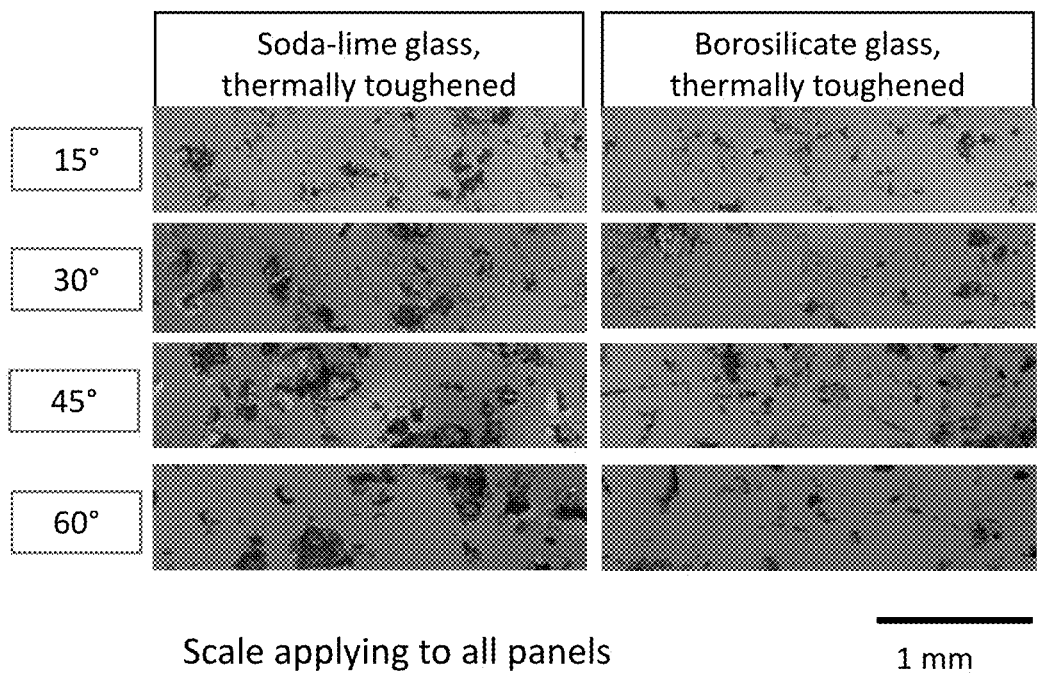
FIG. 8 shows micrographs of surfaces of a soda-lime glass sheet and of a borosilicate glass sheet, which were subjected to a grit trickle test in which these surfaces were exposed to the action of the grit particles, for different angles α' at which the grit particles impinge on the respective glass sheet, and wherein the soda-lime glass sheet and the borosilicate glass sheet were thermally toughened.

Substantially the same results were also found for all measured values of the inclination angle α', as illustrated in FIGS. 7 and 8.

Referring to FIG. 2, it will now be explained how the results of the grit trickle test can be transferred to driving situations such as commonly encountered by motor vehicles in everyday operation.

FIG. 2 shows an even more schematic front view of a setup 1 for performing a grit trickle test, which additionally illustrates particle momentums $P_{r(oad)}$ as occurring in motor vehicles in typical driving situations as such particle impinge on the glass sheet 5.

By first defining a main direction of movement V of a vehicle, an installation position of a glass sheet in or on this vehicle can then be specified relative thereto. By way of example, the sectional view of FIG. 3 shows part of a motor vehicle 7, merely illustrating the laminated glass 8 and body sections 9, 10 of the vehicle supporting it.

If this main direction of movement V is in the horizontal plane 6, relative to which the grit particles 3 move vertically during the grit trickle test until they impinge on the glass sheet 5, the results obtained in the grit trickle test can be transferred to the installation position of the glass sheet in the motor vehicle, in particular with respect to the respective inclination angles α, α' thereof, as described below.

For this purpose, it is assumed that the particles 3' impinging on a vehicle glass, in particular a motor vehicle glass sheet 5 in common actual driving situations are moving against the main direction of movement V and, upon impingement on the glass sheet 5, have a momentum $P_{r(oad)}$.

For transferring the results of the grit trickle test to common actual driving situations, the directions of momentums $P_{t(rickle)}$ and $P_{r(oad)}$ together with the direction of a respective normal N of the surface 5' of glass sheet 5 at the point of impact of the particles 3, 3' are shown in FIG. 2 as lying in a common plane, in order to avoid lateral angular deviations for this transfer.

By way of example, the main direction of movement V of the vehicle, in particular motor vehicle 7, is defined here by its movement parallel to a plane located below the vehicle, here horizontal plane 6 which is parallel to the plane spanned by directions X and Y of the Cartesian coordinate system, as can be seen from FIG. 2.

However, since the directions of momentums $P_{t(rickle)}$ and $P_{r(oad)}$ are perpendicular to one another, it is necessary, for transferring the results of the grit trickle test to common actual driving situations, to accordingly match the angle of inclination α' used in the grit trickle test with the direction of the particles 3 impinging on glass sheet 5.

For this purpose, these transferred angles of inclination α are indicated in FIG. 2, illustrating the inclination α of at least this two-dimensional area 11 with respect to an upward direction S perpendicular to a main direction of movement V of the vehicle.

With this setup, the results of the grit trickle test can be transferred to common driving situations, and the values determined for angle α' can be used for the values of angle α.

Very surprisingly, it has been found that the results obtained with the grit particles used for the grit trickle test can be transferred to common actual driving situations, although in these common actual driving situations: the respective weight of the particles impinging on the glass sheet 5; the respective speed of the particles impinging on the glass sheet 5; the shape of the particles impinging on the glass sheet 5; and the material of the particles impinging on the glass sheet 5 do not necessarily have to match those of the particles used in the grit trickle test.

With the nevertheless transferability of these results as found by the inventors, it is possible to make advantageous design specifications, in particular with respect to the arrangement of a two-dimensional area for a sensor, in particular an optical sensor, preferably an imaging optical sensor, which is assigned to this two-dimensional area, implying the advantages according to the invention.

Therefore, in the context of the present disclosure, particles are in particular also understood as those particles which are used in the subsequent grit trickle test and which also commonly occur in everyday driving situations.

However, first for this purpose, the results of the grit trickle test should be discussed more closely again.

Figure 9:
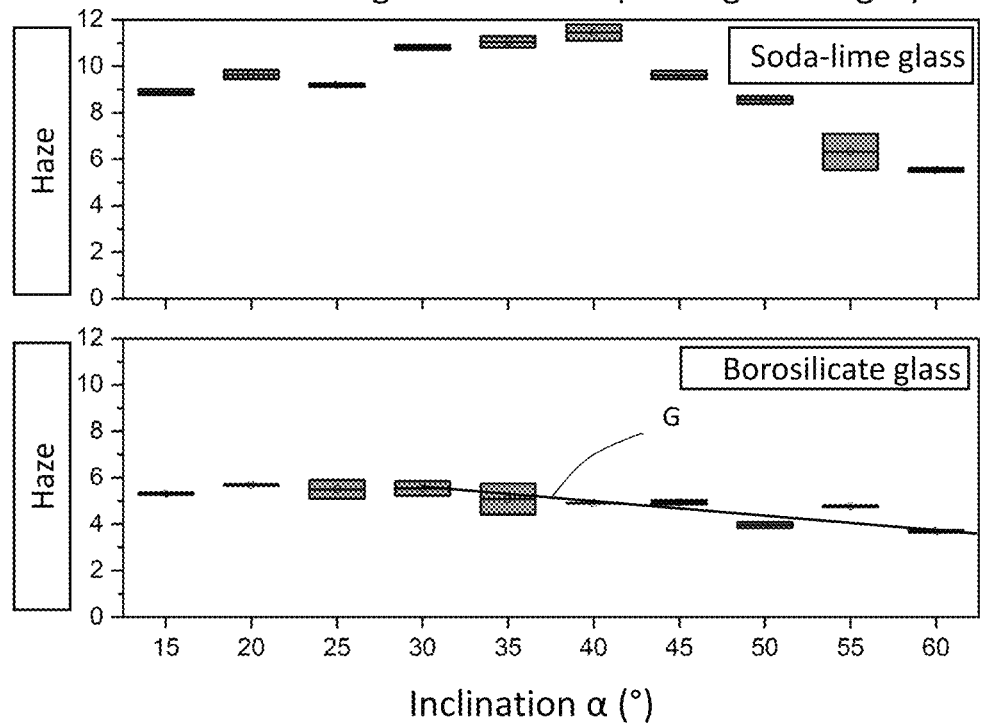
FIG. 9 shows haze values as a result of scattered light measurements obtained as a function of the inclination α' after performing the grit trickle test on a non-toughened soda-lime glass sheet and on a non-toughened borosilicate glass sheet, for a total amount of impacting grit particles of 0.25 kg basalt grit.
Figure 10:
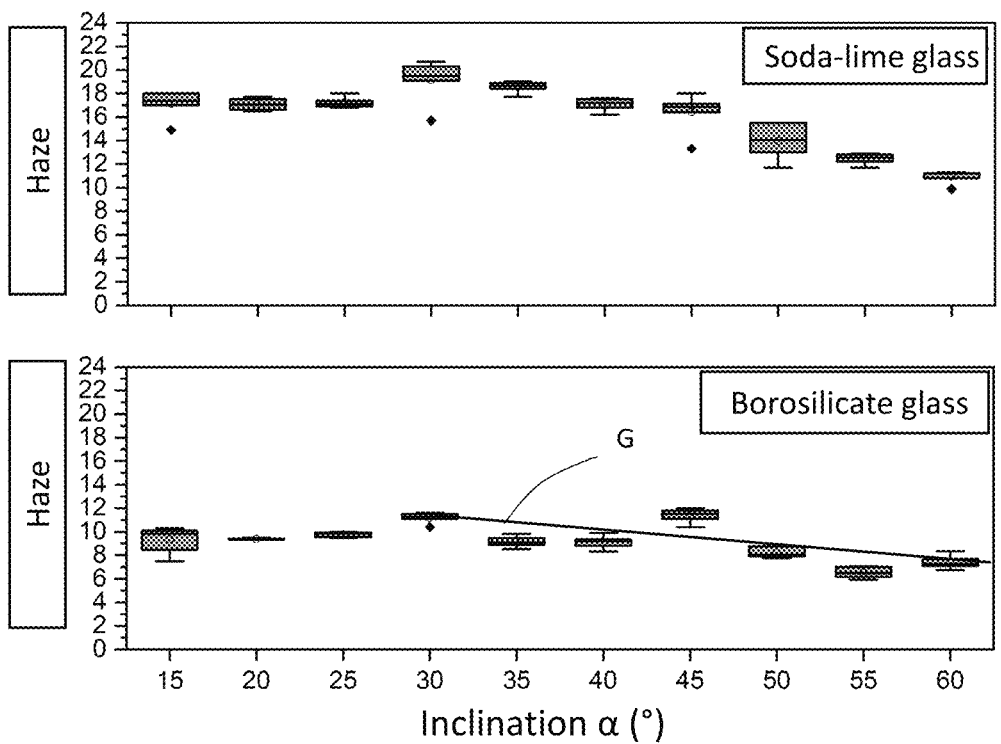
FIG. 10 shows haze values as a result of scattered light measurements obtained as a function of the inclination α' after performing the grit trickle test on a non-toughened soda-lime glass sheet and on a non-toughened borosilicate glass sheet, for a total amount of impacting grit particles of 0.5 kg basalt grit.
Figure 11:
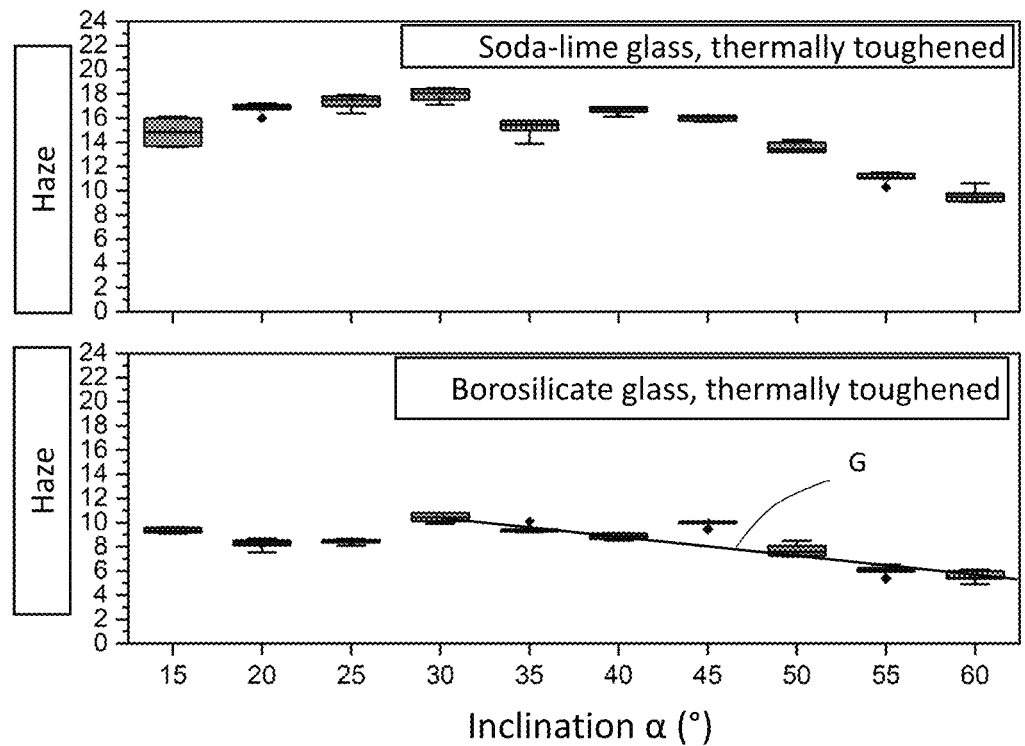
FIG. 11 shows haze values as a result of scattered light measurements obtained as a function of the inclination α' after performing the grit trickle test on a thermally toughened soda-lime glass sheet and on a thermally toughened borosilicate glass sheet, for a total amount of impacting grit particles of 0.5 kg basalt grit.

From the results of scattered light measurements illustrated in FIGS. 9, 10, and 11 in accordance with Table 1 it is clearly obvious, based on the haze values, that the haze values for soda-lime glass sheets are consistently higher than those of borosilicate glass sheets, regardless of whether thermally toughened or not, in particular for all measured angles of inclination.

Moreover, it can be seen that the haze values vary as a function of the respective angle of inclination α.

For the haze values of borosilicate glass, an auxiliary straight line G was drawn in FIGS. 8, 9, and 10, which shows that for angles of inclination α of about 30° and above a steady decrease in the haze values is resulting for increasing angles of inclination α.

Thus, particularly advantageous values reliably result for inclination angles α and thus for an inclination α greater than 35° that can be specified with respect to an upward direction S perpendicular to a main direction of movement V of the vehicle, in particular a direction vertically upward relative to a main direction of movement (V) of the vehicle as shown in FIG. 2, for example. A glass sheet with such angles of inclination or such an inclination α as shown in FIG. 2, for example, will have a correspondingly lower susceptibility for scattered light when exposed to particulate impacts in common actual driving situations.

Due to configurational conditions, especially when using optical sensors, in particular imaging optical sensors, a maximum inclination α of about 65° has furthermore proven to be advantageous, because distortions and a plane-parallel image offset in the optical beam path can be kept low in this case.

Figure 12:
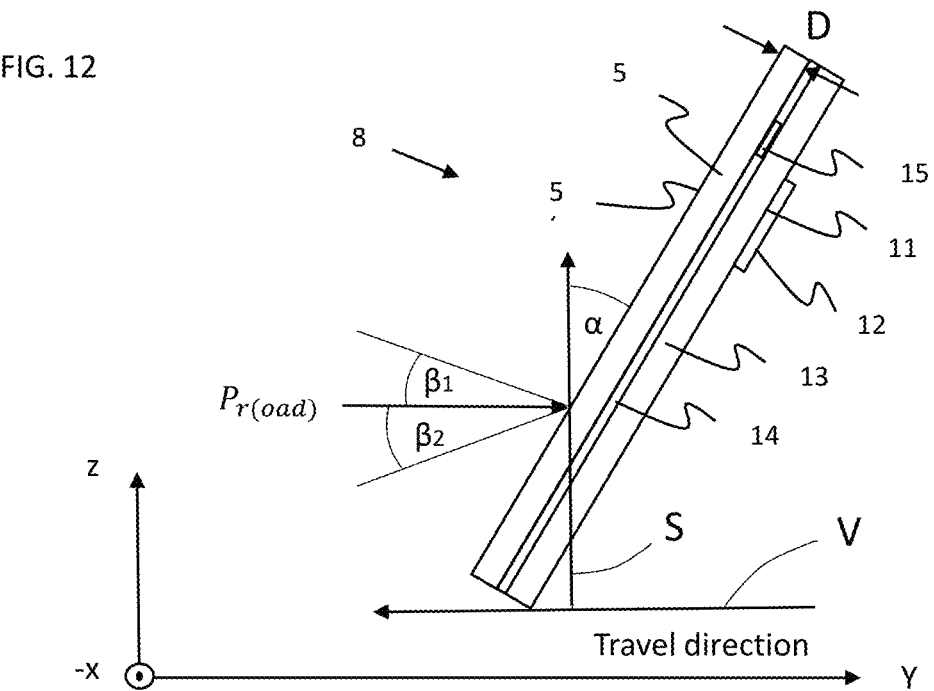
FIG. 12 is a vertical sectional view of a motor vehicle glass comprising a borosilicate glass sheet according to a further embodiment, illustrating the angles β1 and β2 of particles impinging on the vehicle glass.

These specifications apply in particular to a two-dimensional area 11 of the borosilicate glass sheets as presently disclosed, which has assigned to an optical sensor 12, in particular an imaging optical sensor 12 as shown merely schematically in FIG. 4 and FIG. 12.

Hence, the inclination of at least this two-dimensional area with respect to an upward direction S perpendicular to a main direction of movement V of the vehicle, also referred to as vertical inclination α, is advantageously in a range between 35° and 65°, preferably between 40° and 60°.

Thus, an area that can be assigned to a sensor as a two-dimensional area 11 or can be used as an area 11 assigned to a sensor may be any desired area of a vehicle glass 8, 8' which in this two-dimensional area meets the above condition for the presently disclosed vertical inclinations α, α1, and α2 as well as for the horizontal inclination γ as specified below and which has a size that allows light to enter in a degree sufficient for the respective sensor. In the case of simple sensors that only detect brightness, such as light-emitting diodes, this two-dimensional area may have a size of merely 1 cm², and in the case of more complex sensors such as imaging sensors or rain sensors, it may have an area size of up to about 25 cm² or even a larger. This two-dimensional area can have the shape of a square, rectangle, polygon, circle, oval, or of a free form.

As can be seen from FIG. 4, a horizontal inclination γ can also be considered, which is defined by the normal vector N of the surface 5' of glass sheet 5 with respect to the main direction of movement V of the vehicle. For the so defined horizontal inclination γ, the respective statements made in conjunction with the present disclosure regarding the vertical inclination α, $α_1$, and $α_2$ shall apply accordingly. However, due to the geometric relationships that are shown in simplified manner, the following applies to the respective absolute value of the horizontal inclination γ, γ=90°−α, in particular also for the respective disclosed numerical values of α.

In the case of the flat glass shown in FIG. 12, in particular flat laminated glass 8, this vertical angle of inclination or this vertical inclination α applies to the entire surface, in particular also of the first glass sheet 5 of laminated glass 8 with its surface 5'.

For vehicles, in particular in vehicles that are exposed to increased particle load, in particular vehicles for use in a harsh operational environment in which more than 50% of the particles come from an area at a higher level than the borosilicate glass sheet and impinge at an average angle of β1 with respect to the main direction of movement of the vehicle, the inclination α of at least the two-dimensional area assigned to the sensor can be in a range between 35°+β1 and 65° with respect to an upward direction (S) perpendicular to a main direction of movement V of the vehicle.

The embodiment described in the above-mentioned paragraph is not limited to be used in harsh operational environments, but may rather advantageously also be used without any restriction on the operational environment of a motor vehicle. However, in this case, the presently described advantages regarding particles which come from an area at a higher level than the borosilicate glass sheet will be realized.

As also shown in FIG. 12, if more than 50% of the particles come from an area at a deeper level than the borosilicate glass sheet and impinge at an average angle of β2 with respect to the main direction of movement of the vehicle, the inclination α of at least the two-dimensional area assigned to the sensor can be in a range between 35° and 60°−β2 with respect to an upward direction perpendicular to a main direction of movement of the vehicle.

The embodiment described in the above-mentioned paragraph is likewise not restricted to be used in harsh operational environments, but may rather advantageously also be used without any restriction on the operational environment of a motor vehicle. However, in this case, the presently described advantages regarding particles which come from an area at a lower level than the borosilicate glass sheet will be realized.

Figure 14:
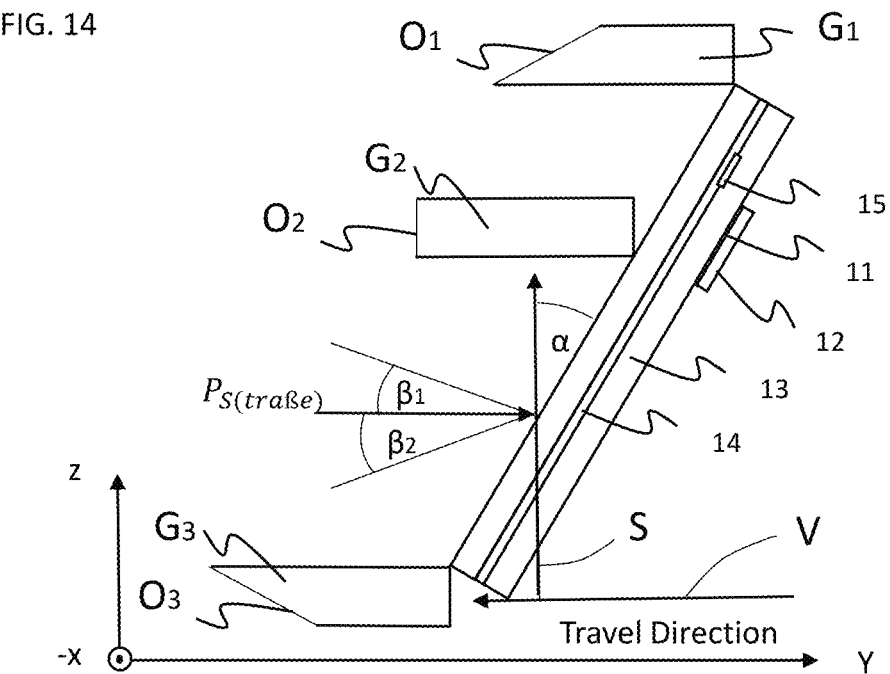
FIG. 14 is the view of FIG. 12, additionally illustrating a device for determining an environment, in particular a harsh operational environment in which more than 50% of the particles come from an area at a higher level than the borosilicate glass pane or in which more than 50% of the particles come from an area at a lower level than the borosilicate glass pane.

The detection of particles coming from an area at a higher level than the borosilicate glass sheet and of particles coming from an area at a lower level than the borosilicate glass sheet may for instance be accomplished by a person skilled in the art as illustrated in FIG. 14 by way of example, namely by using measurement vessels $G_1$, $G_2$, $G_3$ that are open in the direction of travel V and are otherwise closed, in a respective environment under the typical conditions of this environment such as the vehicle speed permitted in this environment. Each of these vessels $G_1$, $G_2$, $G_3$ can be mounted in front of or laterally of the respective vehicle glass, in particular borosilicate glass, and each have the same opening cross section in the direction of travel.

Vessel $G_1$ with its opening $O_1$ facing obliquely upward allows particles to enter from an area at a higher level than the borosilicate glass sheet. Vessel $G_2$ with its horizontally facing opening $O_2$ allows particles to enter from an area in front of the borosilicate glass sheet, and vessel $G_3$ with its opening $O_3$ facing obliquely downward allows particles to enter from an area at a lower level than the borosilicate glass sheet.

The greater the length of the vessels $G_1$, $G_2$, $G_3$ is in the direction of travel and the lower the inclination of openings $O_1$ and $O_2$ is relative to the direction of travel V, the more accurate will be the measurement result obtained, and a person skilled in the art will adapt these vessels according to the respective needs depending on the accuracy requirements.

By weighing the amount $M_1$, $M_2$, $M_3$ of particles collected in the measurement vessels $G_1$, $G_2$, $G_3$ in the respective environment, the person skilled in the art can then determine the ratio of particles from a higher level than the borosilicate glass sheet and of particles from a lower level than the borosilicate glass sheet, for example, by calculating the quotient $M_1/(M_1+M_2+M_3)$ for the particles coming from the area at a higher level, and of $M_3/(M_1+M_2+M_3)$ for the particles coming from the area at a lower level.

For determining the angles β1 and β2 of particles hitting the vehicle glass, the vessel G2 which is preferably arranged in front of the two-dimensional area assigned to the sensor can be tilted upward by a particular angle, i.e. in the positive direction of angle β1, and this tilt angle can be varied between 0° and 30°, for example in increments of 5°, and the vessel G2 can also be tilted downward by a particular angle, i.e. in the positive direction of angle β2, and this tilting angle can be varied between 0° and 25°, for example in increments of 5°, so that all angles which are of interest for the present embodiments can be covered. By driving through the respective environment once or multiple times for each tilt angle, the masses M2 obtained in the vessel G2 while passing through the environment can be assigned to the respective tilt angles and the amount of particles originating from this angle can be determined from these masses M2 assigned to the respective angles. Although an angular interval of 5° is considered sufficient, smaller angular increments might also be selected by a person skilled in the art if the latter nevertheless desires to increase the accuracy of this measurement. In this way it is possible to determine an average for the particles impinging at an angle β1 or β2 relative to the main direction of movement (V) of the vehicle and to determine the mean value for β1 and β2, for example by linear averaging.

Glass sheet 5, in particular in the form of a first sheet of a laminated glass 8, may have a thickness D from 1.1 mm to 5.4 mm.

For example, thicknesses D from 3 mm to 5 mm can be used in particular for trucks.

A borosilicate glass sheet may be used both on the outside, as a glass sheet 5, and on the inside, as a further glass sheet 13, as designated by reference numeral 13 in FIG. 12.

Between outer glass sheet 5 and inner glass sheet 13 of the laminated glass 8, an polymer intermediate layer 14 is disposed, which serves to firmly mechanically hold the glass sheets 5, 13 to one another.

In further embodiments, a sensor 15, in particular an optical sensor 15 may additionally be arranged on the borosilicate glass sheet 5, and in the case of the laminated glass 8 also on the further glass sheet, for example, in or close to the polymer intermediate layer 14, between the borosilicate glass sheet and the further glass sheet. In the present context, a sensor 15 is referred to as being located close to the polymer intermediate layer 14 if it is partially embedded in the polymer intermediate layer 14, in particular laterally in each case, but is not enclosed thereby on all of its sides, but rather has portions adjoining the borosilicate glass sheet 5 and/or adjoining the further glass sheet 13 instead of adjoining the polymer intermediate layer 14.

Figure 13:
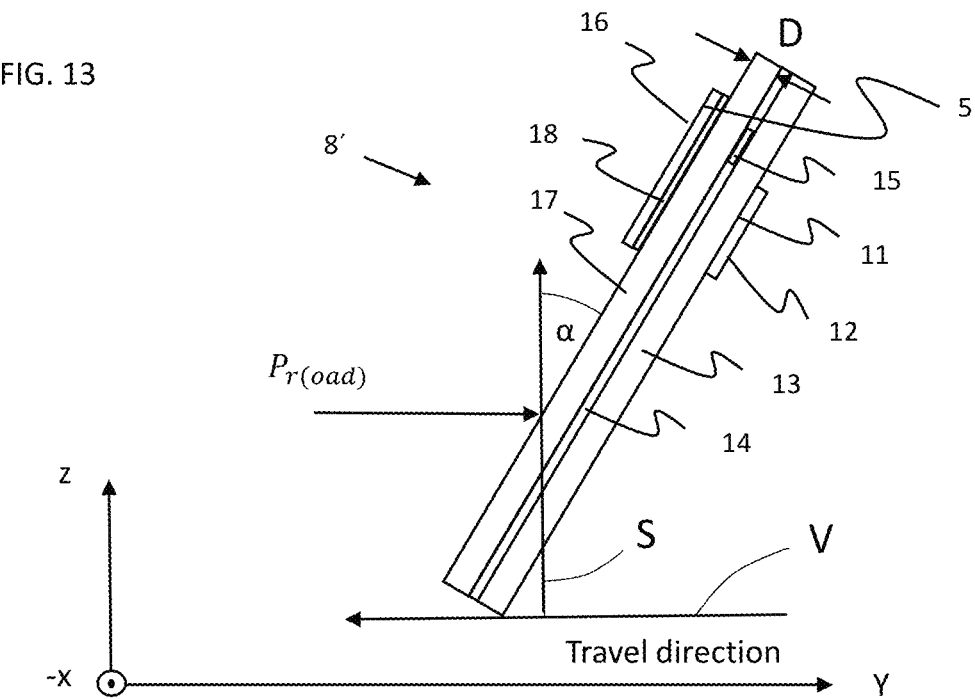
FIG. 13 shows a vertical sectional view of a further motor vehicle glass comprising a borosilicate glass sheet according to a further embodiment, in which the borosilicate glass sheet covers only part of a motor vehicle glass sheet that is not made of borosilicate glass, in order to protect sensors, in particular optical sensors.

Referring now to FIG. 13 which shows a vertical sectional view of a further motor vehicle glass, in particular a laminated glass 8' comprising a borosilicate glass sheet 16 according to a further embodiment.

In this embodiment, the borosilicate glass sheet 16 covers only part of a motor vehicle glass sheet 17 which in particular does not comprise borosilicate glass, in order to protect sensors, in particular in order to protect the optical sensors 12, 15, and thus covers at least the respective two-dimensional area 11 which is assigned to the optical sensor.

A polymer intermediate layer 18 that is disposed between the borosilicate glass sheet 16 and the motor vehicle glass sheet 17 which is the first sheet and in particular does not comprise borosilicate glass, may be tinted and in this case may in particular include a heat-absorbing or heat-reflecting tint.

However, the invention is not limited to flat glass sheets, but may also be implemented if the glass sheets have a curvature, at least in some areas, for example.

In such embodiments as shown in FIGS. 3 and 4, for example, tangents $T_1$, $T_2$ to the surface 5' of the borosilicate glass sheet 5 located within or in front of the two-dimensional area assigned to a sensor should have an inclination $\alpha 1$, $\alpha 2$ in a range between 35° and 60° and preferably between 40° and 60° with respect to an upward direction (S) perpendicular to a main direction of movement of the vehicle, in particular a direction vertically upward relative to a main direction of movement (V) of the vehicle.

As shown in FIG. 3, however, the wording "tangents $T_1$, $T_2$ to the surface 5' located within or in front of the two-dimensional area assigned to a sensor" relates to the beam paths 19, 20 of light passing through the glass sheet, which is subject to refraction at the respective inclined surfaces of glass sheet 5 and of the further, inner glass sheet 13 of the laminated glass 8 and thereby produces a plane-parallel offset. This wording is intended to ensure that the above condition for the respective inclination $\alpha 1$, $\alpha 2$ is met for all light that is incident on the two-dimensional area 11 and thus propagating along beam paths 19, 20.

In such embodiments, in particular because of the plane-parallel offset as mentioned above, it may be advantageous if the two-dimensional area 11 assigned to the sensor 12 is located in the upper third, preferably the upper fifth of the borosilicate glass sheet 5 as defined in the installation position thereof, and in the sense of the present disclosure "upper" or "upward" is understood to refer to the Z direction of the Cartesian coordinate system as indicated in the figures, and the "upper third" or the "upper fifth" of the motor vehicle glass sheet is understood to be the upper third or the upper fifth with respect to the Z direction.

Generally, in the embodiments disclosed above, an optical sensor 12 can be arranged in the two-dimensional area 11 assigned to a sensor, preferably a brightness detecting sensor, an imaging sensor, or a rain sensor.

LIST OF REFERENCE SYMBOLS

1 Setup for performing a grit trickle test
2 Container
3 Grit particles
4 Free fall tube
5 Glass sheet subjected to grit trickle test
5' Surface of glass sheet 5 subjected to particulate impact
6 Horizontal plane relative to which the grit particles 3 move vertically during the grit trickle test until impinging on glass sheet 5
7 Motor vehicle
8 Motor vehicle laminated glass
8' Further embodiment of laminated glass
9 Body section of motor vehicle 7 supporting the laminated glass 8
10 Body section of motor vehicle 7 supporting the laminated glass 8
11 Two-dimensional, but not necessarily flat area of the presently disclosed borosilicate glass sheets, which has an optical sensor 12 assigned to, in particular an imaging optical sensor 12
12 Optical sensor, in particular brightness detecting optical sensor, imaging optical sensor, or rain sensor
13 Further, inner glass sheet of laminated glass 8
14 Polymer intermediate layer
15 Sensor, in particular optical sensor in polymer intermediate layer 14
16 Borosilicate glass sheet of further embodiment
17 Motor vehicle glass sheet which in particular does not comprise borosilicate glass
18 Polymer intermediate layer
19 Beam path of light passing through the glass sheet
20 Beam path of light passing through the glass sheet
F Height of free fall
G Auxiliary line
$G_1$ Measurement vessel
$G_2$ Measurement vessel
$G_3$ Measurement vessel
$M_1$ Amount of particles obtained in measurement vessel $G_1$ by the measurement
$M_2$ Amount of particles obtained in measurement vessel $G_2$ by the measurement
$M_3$ Amount of particles obtained in measurement vessel $G_3$ by the measurement
$P_{t(rickle)}$ Particle momentum of grit particle when performing the grit trickle test
$P_{r(oad)}$ Particle momentums as occurring in typical driving situations of motor vehicles
V Main direction of movement of a vehicle, in particular of a vehicle equipped with the inventive borosilicate glass sheet
S Upward direction perpendicular to the main direction of movement V of the vehicle
N Direction of a normal to the surface 5' of glass sheet 5 at the point of impact of the particles 3
$O_1$ Opening of measurement vessel $G_1$
$O_2$ Opening of measurement vessel $G_1$
$O_3$ Opening of measurement vessel $G_1$
$\alpha'$ Angle of inclination at which the grit particles 3 impinge on glass sheet 5 in the grit trickle test
$\alpha$ Angle of inclination with respect to the upward direction S perpendicular to the main direction of movement V of the vehicle, also referred to as vertical inclination
$\gamma$ Horizontal inclination
$T_1$ Tangent to the surface 5' of glass sheet 5
$T_2$ Tangent to the surface 5' of glass sheet 5

α1 Inclination of tangent $T_1$ to the surface 5' of glass sheet 5 with respect to S
α2 Inclination of tangent $T_2$ to the surface 5' of glass sheet 5 with respect to S
D Thickness of borosilicate glass sheet 5
β1 Angle of impingement of particles from higher level area
β2 Angle of impingement of particles from lower level area

What is claimed is:

1. A vehicle glass sheet, comprising:
a borosilicate glass having a thickness between 1.1 mm and 5.4 mm; and
a two-dimensional area sized and configured to receive a sensor, wherein the two-dimensional area has an inclination (a) with respect to a vertical direction (S) perpendicular to a main vehicle direction of movement (V), and wherein the inclination (a) is in a range between 35° and 65°.

2. The vehicle glass sheet of claim 1, wherein the borosilicate glass is a float glass sheet.

3. The vehicle glass sheet of claim 1, wherein the two-dimensional area is sized and configured to receive an imaging optical sensor.

4. The vehicle glass sheet of claim 1, the inclination (α) is between 35°+β1 and 65°, wherein β1 is an average angle of particle impingement with respect to the main vehicle direction of movement (V) when more than 50% of the particles come from an area at a higher level than the borosilicate glass.

5. The vehicle glass sheet of claim 1, the inclination (α) is between 35° and 60°-β2, wherein β2 is an average angle of particle impingement with respect to the main vehicle direction of movement (V) when more than 50% of the particles come from an area at a lower level than the borosilicate glass.

6. The vehicle glass sheet of claim 1, further comprising a curvature.

7. The vehicle glass sheet of claim 6, further comprising at least two tangents $T_1$, $T_2$ to a surface of the borosilicate glass within the two-dimensional area have a second inclination (α) with respect to the vertical direction (S), wherein the second inclination (α) is between 35° and 60°.

8. The vehicle glass sheet of claim 1, wherein the two-dimensional area is located within an upper third of the borosilicate glass when installed.

9. The vehicle glass sheet of claim 1, wherein the borosilicate glass is chemically toughened or thermally toughened and has a near-surface compressive stress between 100 MPa and 300 MPa.

10. The vehicle glass sheet of claim 9, wherein the borosilicate glass has a depth of the compressive stress zone from 25 µm to 50 µm.

11. The vehicle glass sheet of claim 1, wherein the borosilicate glass comprises a composition in wt % of:
$SiO_2$ 70-87,
$B_2O_3$ 7-25,
$Na_2O+K_2O$ 0.5-9,
$Al_2O_3$ 0-7, and
$CaO$ 0-3.

12. The vehicle glass sheet of claim 1, wherein the borosilicate glass comprises a composition in wt % of:
$SiO_2$ 70-86,
$Al_2O_3$ 0-5,
$B_2O_3$ 9.0-25,
$Na_2O$ 0.5-5.0,
$K_2O$ 0-1.0, and
$Li_2O$ 0-1.0.

13. The vehicle glass sheet of claim 1, wherein the borosilicate glass comprises a composition in mol % of:
$SiO_2$ 71.8-88.7,
$B_2O_3$ 7.8-22.7,
$Al_2O_3$ 0-3.1,
$Na_2O$ 0.5-5.1,
$K_2O$ 0-0.6, and
$Li_2O$ 0.0-2.1.

14. The vehicle glass sheet of claim 13, wherein the composition meets conditions of:

$B_2O_3+Al_2O_3-Na_2O-K_2O-Li_2O \geq 3$ mol %, and $B_2O_3+Al_2O_3-Na_2O-K_2O-Li_2O \leq 11$ mol %.

15. The vehicle glass sheet of claim 13, wherein the composition meets conditions of:

$B_2O_3+Al_2O_3-Na_2O-K_2O-Li_2O \geq 2$ mol %, and $B_2O_3+Al_2O_3-Na_2O-K_2O-Li_2O \leq 10$ mol %.

16. The vehicle glass sheet of claim 1, wherein the borosilicate glass comprises a composition in wt % of:
$SiO_2$ 78.3-81.0,
$B_2O_3$ 9.0-13.0,
$Al_2O_3$ 3.5-5.3,
$Na_2O$ 3.5-6.5,
$K_2O$ 0.0-2.0, and
$CaO$ 0.0-2.0.

17. The vehicle glass sheet of claim 1, wherein the borosilicate glass comprises a composition in mol % of:
$SiO_2$ 80.7-84.3,
$B_2O_3$ 8.0-11.6,
$Al_2O_3$ 2.2-3.2,
$Na_2O$ 3.5-6.5,
$K_2O$ 0.2-1.3, and
$CaO$ 0.0-2.2.

18. The vehicle glass sheet of claim 17, wherein the composition meets conditions of:

$B_2O_3+Al_2O_3-Na_2O-K_2O-CaO \geq 3$ mol %, and $B_2O_3+Al_2O_3-Na_2O-K_2O-CaO \leq 11$ mol %.

19. The vehicle glass sheet of claim 17, wherein the composition meets conditions of:

$B_2O_3+Al_2O_3-Na_2O-K_2O-CaO \geq 2$ mol %, and $B_2O_3+Al_2O_3-Na_2O-K_2O-CaO \leq 10$ mol %.

20. A vehicle glass, comprising:
a borosilicate glass sheet having a thickness between 1.1 mm and 5.4 mm and a two-dimensional area sized and configured to receive a sensor, wherein the two-dimensional area has an inclination (α) with respect to a vertical direction (S) perpendicular to a main vehicle direction of movement (V), and wherein the inclination (α) is in a range between 35° and 65°;
a second glass sheet; and
a polymer intermediate layer laminating the borosilicate glass sheet and the second glass sheet to one another.

21. The vehicle glass of claim 20, further comprising an optical sensor disposed at the two-dimensional area.

22. The vehicle glass of claim 21, wherein the optical sensor is disposed between the borosilicate glass sheet and the second glass sheet.

23. The vehicle glass of claim 20, wherein the polymer intermediate layer is tinted.

* * * * *